United States Patent [19]

Rogers et al.

[11] 4,369,212

[45] Jan. 18, 1983

[54] PROCESS FOR REMOVING RESIDUES FROM GAS ELECTRODES

[75] Inventors: Howard H. Rogers, Torrance; Steven J. Stadnick, Redondo Beach, both of Calif.

[73] Assignee: Hughes Aircraft Company, Culver City, Calif.

[21] Appl. No.: 198,377

[22] Filed: Oct. 20, 1980

[51] Int. Cl.³ .......................... B05D 3/00; B05D 5/12; H01M 6/00

[52] U.S. Cl. ................................... 427/352; 29/25.17; 29/623.4; 29/623.5; 427/115; 427/125; 427/307

[58] Field of Search ..................... 156/638, 639, 630; 427/115, 307, 352, 335, 125, 123; 134/5, 10.1; 429/101, 217, 234, 49, 251; 29/2, 25.17, 623.1, 623.5, 623.4; 252/162, 170, 171, 364; 521/918, 919; 432/7, 13; 106/311; 204/32 R, 325, 141.5

[56] References Cited

U.S. PATENT DOCUMENTS

| | | | |
|---|---|---|---|
| 3,407,249 | 10/1968 | Landi | 429/250 |
| 3,637,513 | 1/1972 | Schneider | 252/171 |
| 3,822,213 | 7/1974 | Johnson | 252/162 |
| 4,229,490 | 10/1980 | Frank et al. | 427/113 |
| 4,250,235 | 2/1981 | DuPont et al. | 429/211 |
| 4,252,878 | 2/1981 | Lazarz et al. | 429/250 |

*Primary Examiner*—Thurman K. Page
*Attorney, Agent, or Firm*—David W. Collins; W. H. MacAllister; A. W. Karambelas

[57] ABSTRACT

A process is provided for removing contaminating residues left behind during fabrication of gas electrodes employed in metal/gas batteries, e.g., nickel/hydrogen batteries, and fuel cells employing gas electrodes. Such residues arise from depositing and sintering on a conductive, screen-type electrode substrate a platinum powder/polytetrafluoroethylene powder mixture containing a suspending agent. The residues of the suspending agent are removed by contacting the fabricated electrode with a solvent mixture comprising a first solvent, e.g., trichloroethylene, for dissolving the residues and a second solvent, e.g., ethanol, for wetting the polytetrafluoroethylene.

25 Claims, No Drawings

PROCESS FOR REMOVING RESIDUES FROM GAS ELECTRODES

The U.S. Government has rights in this invention pursuant to Contract No. F04701-79-C-0006 awarded by the Department of the Air Force.

BACKGROUND OF THE INVENTION

1. Field of the Invention

This invention is directed to metal/gas batteries and fuel cells employing gas electrodes, and, more particularly, to a process for removing residues from fabricated gas electrodes prior to assembly of the battery or fuel cell.

2. Description of the Prior Art

A metal/gas battery or fuel cell comprising a gas electrode comprises a plurality of positive electrodes, a plurality of negative electrodes and an electrolyte. Expanded mesh screen, woven wire mesh and punched metal foil have variously been used in the prior art as electrode substrates. Patent applications Ser. Nos. 066,987 (now U.S. Pat. No. 4,250,235, issued Feb. 10, 1981) and 066,989 now U.S. Pat. No. 4,283,884 provide a novel etched nickel foil electrode substrate for nickel/hydrogen batteries which results in (a) lower electrical losses as compared with the same weight electrodes of other constructions and (b) more efficient packing density in the pressure vessel containing the electrodes. The etched foil electrode substrates are used for both positive and negative electrodes and are conveniently electrochemically etched from nickel sheet material in a grid mesh pattern.

In the fabrication of gas electrodes, porous polytetrafluoroethylene film (available from W. L. Gore & Assoc., Inc., Elkton, Md., under the trademark GORE-TEX) is attached to one side of the electrode substrate. The opposite side of the electrode substrate is provided with an electrochemically active coating comprising a mixture of platinum powder and small polytetrafluoroethylene particles. This coating is conveniently applied by silk screening a paste of fuel cell grade platinum black mixed with polytetrafluoroethylene particles held in suspension with TRITON X-100 non-ionic surfactant (available from Rohm and Haas Company, Philadelphia, PA). The negative electrode assembly is then sintered by slow heating over a one hour period to about 320° C. and held at that temperature for ten minutes. The fabricated electrodes are then allowed to slow cool.

Heating to about 320° C. is done, inter alia, to decompose and remove residues of the suspending agent. However, it has been found that residues of the suspending agent still remain, consequently providing conditions conducive to "flooding" and concomitantly reduced current density, along with a higher polarization than desired.

SUMMARY OF THE INVENTION

In accordance with the invention, an improved process is provided for the fabrication of a metal/gas battery or fuel cell employing a gas electrode by removing residues of suspending agent used in the fabrication of the gas electrode. The battery or fuel cell comprises a plurality of positive electrodes, a plurality of negative electrodes and an electrolyte. One or the other or both electrodes may be a gas electrode. The gas electrode includes a conductive, screen-type substrate having first and second faces, with porous polytetrafluoroethylene attached to the first face and a platinum powder/polytetrafluoroethylene powder mixture sintered on the second face. The platinum powder/polytetrafluoroethylene mixture is applied to the substrate, as by silkscreening, employing a suspending agent as a vehicle; the substrate is then sintered.

The improved process comprises:
(a) soaking fabricated gas electrodes in a first solvent bath which comprises a solution consisting essentially of
   (1) a first solvent for dissolving the suspending agent, and
   (2) a second solvent for wetting the polytetrafluoroethylene; and
(b) removing any residues of the solution from the electrodes.

As a consequence of the process of the invention, a reduction in polarization of up to about 30% on both charge and discharge is obtained.

DETAILED DESCRIPTION OF THE INVENTION

The description which follows below is given in terms of nickel/hydrogen battery, employing a nickel hydroxide anode, hydrogen cathode (Pt catalyst on a nickel screen) and aqueous potassium hydroxide electrolyte. However, it should be understood that other conductive substrates, such as tantalum, niobium, tungsten, gold and graphite cloth, may also be employed in metal/gas batteries and fuel cells containing a gas electrode. Gas electrodes other than hydrogen, such as oxygen, may also be employed, as appropriate. The configuration for such conductive substrates is described below as being screen-type. Such configuration is meant to include woven screen, etched screen, punched screen, expanded mesh and other light weight substrates. Heavy weight substrates, such as porous metal, are excluded. For batteries and fuel cells employing metals other than nickel, it is contemplated that appropriate changes in the electrolyte would be made. Alkaline or acidic electrolytes may appropriately be used.

An example of a metal/gas battery to which the improved process of the invention applies is more fully described in the above-mentioned patent application, Ser. Nos. 066,987 (U.S. Pat. No. 4,250,235) and 066,989 now U.S. Pat. No. 4,283,884. As disclosed therein, a nickel/hydrogen battery comprises a plurality of positive electrodes, a plurality of negative (gas) electrodes and an electrolyte. The positive electrode comprises nickel hydroxide, $Ni(OH)_2$, impregnated in porous sintered nickel supported on an etched nickel electrode substrate. The negative electrode (the hydrogen electrode) includes a platinum/polytetrafluoroethylene coating, again supported on an etched nickel electrode substrate.

The electrolyte is aqueous potassium hydroxide. The chemical reaction which produces electrons is the change in valence of the nickel hydroxide on the positive electrode between the two and three valence states. The simplified reaction at the positive electrode can be represented as

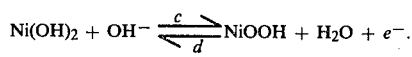

Similarly, the simplified reaction at the negative electrode can be represented as

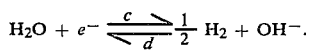

The negative electrode, the processing of which is benefited by the invention, comprises an etched nickel substrate. In a specific example, the substrate is electrochemically etched from nickel sheet material 0.003 inches (0.008 centimeters) thick in a mesh pattern.

On one side of the substrate is attached a thin disc of polytetrafluoroethylene, such as Gore's GORE-TEX film, which is porous to allow gas transfer. The thin disc is attached by a suitable adhesive. An electrochemically active coating comprising a mixture of platinum powder and small polytetrafluoroethylene particles is applied to the other side of the substrate, employing a suspension of polytetrafluoroethylene particles in a wetting agent. The suspension is mixed with the platinum powder and evenly applied, as by silk screening or spraying. The negative electrode assembly is then sintered by slow heating over a one hour period to about 320° C. and thereafter held at that temperature for ten minutes. From the sintering temperature, the electrodes are allowed to slow cool in the furnace.

A lead is then attached to the electrode. A plurality of the electrodes, with separators, are then assembled in the battery structure, together with positive electrodes, electrolyte and other components.

A commonly used suspending or wetting agent for the polytetrafluoroethylene particles is a surfactant which consists essentially of a water-soluble, iso-octyl phenoxypolyethoxyethanol containing an average of ten moles of ethylene oxide, available from Rohm and Haas Company, Philadelphia, PA, under the trademark TRITON X-100 non-ionic surfactant. However, the polytetrafluoroethylene and suspending agent form an unstable mixture which is coagulatable by pH, ultrasonic, platinum and other disturbances. Sintering serves to form the permanent electrode structure and to remove the suspending agent.

Once the battery is assembled, the electrode must be maintained in a partially wet condition. If the negative electrode is fully wetted, then it is "flooded" and no current passes; while if the negative electrode is dry, no hydroxyl ions (current carriers) will pass. Since even residues of the surfactant will lower the surface tension of the electrolyte and thus promote wetting of the electrodes, it is believed that such residues are a significant contributor to potential flooding of the negative electrode. Thus, it is imperative to remove all traces of the suspending agent prior to assembling the battery. While sintering has been used to remove the surfactant, residues have been found to still remain.

In accordance with the invention, these residues are removed following sintering of the gas electrode (here, the negative hydrogen electrode) by a process which comprises contacting fabricated gas electrodes with a first solvent mixture comprising a solution consisting essentially of a first solvent for dissolving the suspending agent or surfactant and a second solvent for wetting the polytetrafluoroethylene backing and active platinum mixture. Without wetting of the polytetrafluoroethylene, the first solvent is unable to contact and therefore to effectively remove surfactant residues.

In the case of the surfactant specifically mentioned above, suitable solvents used for dissolving the surfactant include chlorinated aliphatics such as trichloroethylene and dichloromethane, aromatics such as xylene and toluene, and alcohols such as ethanol. The second solvent comprises whatever material wets polytetrafluoroethylene; an example of such a material is ethanol. Care must be taken in the selection of the two solvents, however, since some solvents, such as methanol and propanol, may burst into flame when placed in contact with the sintered platinum electrode. While ethanol alone is suitable to serve as both first solvent and second solvent, a preferred solvent mixture comprises a first solvent of trichloroethylene and a second solvent of ethanol.

Advantageously, the vapor pressures of both of these solvents are close and therefore the solvent ratio remains fairly constant during use. It is convenient, although not necessary, in selecting other solvent pairs to employ solvents having about the same vapor pressure.

In selecting the ratio of the two solvents, it is preferred that as little alcohol as possible needed to obtain wetting of the polytetrafluoroethylene be employed, because the trichloroethylene is a superior solvent for surfactant residues. In the case of the trichloroethylene/ethanol solvent bath, a 50/50 (volume) ratio is sufficient.

The fabricated gas electrodes are soaked in the solvent bath for a period of time sufficient to remove substantially all residues of the surfactant. Since the removal process is diffusion-limited, the period of time depends on bath temperature, rate of agitation, etc. Typically, about one hour at room temperature under mild agitation is sufficient to remove the residues. Surface tension measurements on the electrode made by evaporating the solvent and dissolving the remainder in water are suitable in determining the extent of removal of the residues.

Any residues from the first solvent bath remaining on the electrodes are then removed. Such residues are, of course, contaminated with residues of the surfactant.

Advantageously, the residues remaining on the electrodes are removed by rinsing the electrodes in a second solvent bath. Again, the rinsing is done for a period of time sufficient to remove substantially all traces of the first solvent bath; about 15 minutes at room temperature under mild agitation is sufficient. A suitable second solvent bath comprises ethanol. Trichloroethylene is not used because of difficulty in removing traces by water. The electrodes are next rinsed in water to remove residues of the second solvent bath and are then dried and assembled with metal electrodes and electrolyte to form the metal/gas (here, nickel/hydrogen) battery, as described above.

Metal/gas batteries and fuel cells employing gas electrodes processed in accordance with the invention evidence a decreased likelihood of "flooding" and a reduced polarization. The reduced polarization implies a lower voltage drop during charge/discharge cycling and accordingly a higher operating efficiency for the battery.

EXAMPLES

Negative electrodes were fabricated on etched nickel foil substrates. A thin (0.002 inch) disc of GORE-TEX film was attached to one side by pressing on a nickel substrate which had been sprayed with TEFLON-30 suspension (a suspension of polytetrafluoroethylene powder and TRITON X-100 non-ionic surfactant, available from E. I. DuPont de Nemours & Co., Inc., Wilmington, Del.). A mixture of fuel cell grade platinum black (Engelhard Industries, Newark, N.J.) and TEFLON 30 suspension was silk-screened on to the other side of the substrate. The electrodes were then sintered at about 320° C. and were tested and compared with negative electrodes which had been additionally processed following sintering in accordance with the invention by rinsing in a 50/50 (vol.) trichloroethylene/ethanol solvent bath. Polarization data at various applied currents were measured; these are listed in the Table below. Current in mA/cm$^2$ is given along with polarization $\eta$ on both oxidation and reduction in millivolts.

RESULTS OF NEGATIVE ELECTRODES PROCESSED IN ACCORDANCE WITH THE INVENTION (TREATED) COMPARED TO NEGATIVE ELECTRODES PROCESSED CONVENTIONALLY (UNTREATED).

| NEGATIVE ELECTRODE | I(mA/cm$^2$) | $\eta_{ox}$(mV) | $\eta_{red}$(mV) |
|---|---|---|---|
| AA-19 | 0 | 0.3 | 0.2 |
| (Untreated) | 25 | 30.1 | −27.3 |
|  | 50 | 60.1 | −53.8 |
| AA-19 | 0 | 0.1 | −0.1 |
| (Treated) | 25 | 27.1 | −23.5 |
|  | 50 | 57.1 | −44.7 |
| AA-21 | 0 | 0.2 | 0.5 |
| (Untreated) | 25 | 26.2 | −24.5 |
|  | 50 | 53.2 | −47.4 |
| AA-21 | 0 | 0.2 | 0.0 |
| (Treated) | 25 | 27.6 | −25.0 |
|  | 50 | 57.8 | −47.6 |
| AA-23 | 0 | 0 | 0 |
| (Untreated) | 25 | 32.0 | 31.5 |
|  | 50 | 63.0 | −59.2 |
| AA-23 | 0 | 0.2 | 0.2 |
| (Treated) | 25 | 29.9 | −26.9 |
|  | 50 | 61.8 | −50.7 |

In most instances, a reduction in polarization was obtained employing the process of the invention.

What is claimed is:

1. In the process for fabricating a metal/gas battery or fuel cell containing a gas electrode comprising a plurality of positive electrodes, a plurality of negative electrodes and an electrolyte, at least one of said electrodes being a gas electrode, each of said gas electrodes comprising a conductive screen-type substrate, said substrate further having first and second faces, with porous polytetrafluoroethylene attached to said first face and with a platinum powder/polytetrafluoroethylene powder mixture sintered on said second face, said mixture being deposited in said second face employing a suspending agent as a vehicle for deposition, the improvement which comprises removing all residues of said suspending agent remaining after the sintering process by a process which comprises:
   (a) soaking fabricated negative electrodes in a first solvent bath which comprises a solution consisting essentially of
      (1) a first solvent for dissolving said residues of said suspending agent, and
      (2) a second solvent for wetting said porous polytetrafluoroethylene; and
   (b) removing any residues of said solution from said electrodes.

2. The process of claim 1 in which said gas electrodes comprises a hydrogen electrode.

3. The process of claim 1 in which said gas electrode comprises an oxygen electrode.

4. The process of claim 1 in which said conductive substrate comprises a material selected from the group consisting of nickel, tantalum, niobium, tungsten, gold and graphite.

5. The process of claim 4 in which said conductive substrate comprises nickel.

6. The process of claim 5 for fabricating a nickel/hydrogen battery in which said negative electrode comprises a hydrogen electrode.

7. The process of claim 1 in which said suspending agent is a surfactant consisting essentially of a water-soluble iso-octyl phenoxypolyethoxyethanol containing an average of ten moles of ethylene oxide.

8. The process of claim 7 in which said first solvent comprises a liquid selected from the group consisting of chlorinated aliphatics, aromatics and alcohols.

9. The process of claim 8 in which said first solvent comprises a liquid selected from the group consisting of trichloroethylene, dichloromethane, xylene, toluene and ethanol.

10. The process of claim 9 in which said first solvent comprises trichloroethylene.

11. The process of claim 1 in which said second solvent comprises ethanol.

12. The process of claim 1 in which said residues of said solution are removed from said electrodes by
   (a) rinsing said electrodes in a second solvent bath;
   (b) rinsing said electrodes in water; and
   (c) drying said electrodes.

13. The process of claim 12 in which said second solvent bath comprises ethanol.

14. A process for fabricating a gas electrode for metal/gas batteries and fuel cells which includes:
   (a) providing a screen-type conductive substrate having two faces;
   (b) attaching porous polytetrafluoroethylene film to one face;
   (c) depositing a mixture of platinum powder, polytetrafluoroethylene powder and suspending agent onto the other face;
   (d) sintering said substrate at a temperature sufficient to bond said platinum and polytetrafluoroethylene powder and to remove said suspending agent, characterized in that said fabricated gas electrode is further treated by a process which comprises:
      (1) removing all residues of said suspending agent remaining after said sintering by soaking said electrode in a first solvent bath which comprises a solution consisting essentially of
         (a) a first solvent for dissolving said residues of said suspending agent, and
         (b) a second solvent for wetting said sintered polytetrafluoroethylene powder; and
      (2) removing any residues of said solution from said electrode.

15. The process of claim 14 in which said gas electrode comprises a hydrogen electrode.

16. The process of claim 14 in which said gas electrode comprises an oxygen electrode.

17. The process of claim 14 in which said conductive substrate comprises a material selected from the group consisting of nickel, tantalum, niobium, tungsten, gold and graphite.

18. The process of claim 17 in which said conductive substrate comprises nickel.

19. The process of claim 14 in which said suspending agent is a surfactant consisting essentially of a water-soluble iso-octyl phenoxypolyethoxyethanol containing an average of ten moles of ethylene oxide.

20. The process of claim 19 in which said first solvent comprises a liquid selected from the group consisting of chlorinated aliphatics, aromatics and alcohols.

21. The process of claim 20 in which said first solvent comprises a liquid selected from the group consisting of trichloroethylene, dichloromethane, xylene, toluene and ethanol.

22. The process of claim 21 in which said first solvent comprises trichloroethylene.

23. The process of claim 14 in which said second solvent comprises ethanol.

24. The process of claim 14 in which said residues of said solution are removed from said electrodes by
 (a) rinsing said electrodes in a second solvent bath;
 (b) rinsing said electrodes in water; and
 (c) drying said electrodes.

25. The process of claim 24 in which said second solvent bath comprises ethanol.

* * * * *